United States Patent [19]
Köhler et al.

[11] Patent Number: 5,824,741
[45] Date of Patent: Oct. 20, 1998

[54] IMPACT-RESISTANT THERMOPLASTIC MOULDING COMPOSITIONS

[75] Inventors: Burkhard Köhler, Leverkusen; Werner Tischer, Dormagen; Rolf-Volker Meyer, Leverkusen, all of Germany

[73] Assignee: Bayer AG, Leverkusen, Germany

[21] Appl. No.: 856,556

[22] Filed: May 15, 1997

[30] Foreign Application Priority Data

May 22, 1996 [DE] Germany .................. 196 20 587.5

[51] Int. Cl.⁶ ................... C08L 9/02; C08L 9/06
[52] U.S. Cl. ............... 525/73; 525/74; 525/78; 525/80; 525/87
[58] Field of Search ................. 525/73, 74, 78, 525/80, 87

[56] References Cited

U.S. PATENT DOCUMENTS

| | | | |
|---|---|---|---|
| 4,473,683 | 9/1984 | Coran et al. | 525/78 |
| 4,487,886 | 12/1984 | Dunning et al. | 525/86 |
| 4,490,506 | 12/1984 | Sakano et al. | 525/67 |
| 4,757,110 | 7/1988 | Sato et al. | 525/78 |

OTHER PUBLICATIONS

5. ABS —Polymerisate, *Ullmanns Enzyklopädie,* vol. 19, pp.277–295 (1982).

Primary Examiner—Jeffrey C. Mullis
Attorney, Agent, or Firm—Connolly & Hutz

[57] ABSTRACT

This invention relates to impact-resistant thermoplastic moulding compositions based on a graft rubber, a thermoplastic resin and a small quantity of a free acid-functional nitrile rubber.

12 Claims, No Drawings

IMPACT-RESISTANT THERMOPLASTIC MOULDING COMPOSITIONS

This invention relates to impact-resistant thermoplastic moulding compositions based on a graft rubber, a thermoplastic resin and a small quantity of a free acid-functional nitrile rubber.

Blends of graft rubber and thermoplastic resins are known in principle. Known ABS plastics comprise blends of graft polymers of styrene and acrylonitrile on polybutadiene with styrene/acrylonitrile copolymers. The graft polymers contained therein are usually produced by emulsion polymerisation, i.e. polymerisation of monomeric styrene and acrylonitrile in the presence of the polybutadiene in latex form. The polybutadiene latices required for this purpose are relatively easy to produce if they have particles of an average diameter of 100 to 250 nm. Considerably difficulties must be overcome if latices having larger particles are to be produced. ABS plastics based on readily available polybutadiene latices, however, have relatively low toughness.

There is thus a requirement to produce ABS type plastics from readily available rubber latices having relatively small particles which plastics nevertheless have good toughness and elevated hardness.

The invention is based on the recognition that thermoplastic moulding compositions based on butadiene/acrylonitrile copolymer rubbers grafted with styrene and acrylonitrile have good toughness and hardness if a small quantity of an acid-functional nitrile rubber is added to them.

The present invention accordingly provides a thermoplastic composition prepared from A) 80 to 99.7 wt. % of a two-phase plastic prepared from
   A.1) 0 to 90 parts by weight, preferably 10 to 80 parts by weight, particularly preferably 20 to 75 parts by weight of a thermoplastic co- or terpolymer of styrene, α-methylstyrene, ring-substituted styrene, methyl methacrylate, acrylonitrile, methacrylonitrile, maleic anhydride, N-substituted maleimide, vinyl acetate or mixtures thereof and
   A.2) 10 to 100 parts by weight, preferably 90 to 20 parts by weight and particularly preferably 25 to 80 parts by weight of a graft product of
      A.2.1) 5 to 90 parts by weight, preferably 30 to 80 parts by weight, of styrene, α-methylstyrene, ring-substituted styrene, methyl methacrylate, acrylonitrile, methacrylonitrile, maleic anhydride, N-substituted maleimide, vinyl acetate or mixtures thereof on
      A.2.2) 95 to 100 parts by weight, preferably 70 to 20 parts by weight of a rubber copolymer of 70 to 95 wt. % of butadiene and 5 to 30 wt. % of acrylonitrile having an average particle diameter of 100 to 250 μm and
B) 0.3 to 20 wt. % of an acid-functional nitrile rubber.

Preferred graft products for the purposes of the invention are graft products of styrene and acrylonitrile on polybutadiene/acrylonitrile copolymers, wherein in general 50 to 90 wt. % of styrene and 10 to 50 wt. % of acrylonitrile are present in the mixture of graft monomers and 5 to 30 wt. % of acrylonitrile is present in the grafting backbone. The graft products generally contain from 10 to 30 wt. % of polybutadiene/acrylonitrile copolymers in the form of small particles. The polybutadiene is generally crosslinked. These graft products may be obtained by polymerising styrene and acrylonitrile in the presence of a polybutadiene/acrylonitrile latex. In general, the graft product is itself a mixture of free styrene/acrylonitrile copolymer and rubber particles on which the styrene and acrylonitrile are grafted. The rubber content of this product may be adjusted to the desired value by adding separately produced styrene/acrylonitrile copolymer. This mixture is termed a graft polymer. The particle size of the polybutadiene/acrylonitrile latex is preferably 100 to 250 nm.

ABS plastics are known. Summary reviews may be found in *Ullmann's Enzyklopädie*, volume 19, pages 277 et seq. and in *Roempp's Chemielexikon*, 8th edition 1987, volume 2, pages 25 et seq.

Acid-functional nitrile rubbers B) are copolymers prepared from 10 to 50 wt. % of acrylonitrile, 0.5 to 10 wt. % of acrylic or methacrylic acid or fumaric acid or itaconic acid or maleic acid or maleic acid monoalkyl esters, preferably fumaric acid or methacrylaic acid and 89.5 to 40 wt. % of butadiene. These copolymers are also known.

The present invention also provides the use of these thermoplastic compositions as additives for aromatic polycarbonates.

Polycarbonates for the purposes of the present invention are both homopolycarbonates and copolycarbonates; the polycarbonates may be linear or branched in a known manner.

A proportion, up to 80 mol. %, preferably of 20 mol. % to 50 mol. % of the carbonate groups in the polycarbonates suitable according to the invention may be replaced by aromatic dicarboxylic acid ester groups. Such polycarbonates, which contain both acid residues of carbonic acid and acid residues of aromatic dicarboxylic acids incorporated in the molecular chain, are known as aromatic polyester carbonates. In the present connection, they should be taken to be included by the term thermoplastic, aromatic polycarbonates.

Aromatic polycarbonates may be produced in a known manner from diphenols, carbonic acid derivatives, optionally chain terminators and optionally branching agents, wherein, in order to produce polyester carbonates, a proportion of the carbonic acid derivatives are replaced by aromatic dicarboxylic acids or derivatives thereof, specifically to the extent that aromatic carbonate structural units are to be replaced by aromatic dicarboxylic acid ester structural units.

Details relating to the production of polycarbonates have been disclosed in many publications over the past 40 years or so. Reference is made merely by way of example to: *Chemistry and Physics of Polycarbonates, Polymer Reviews*, volume 9, Interscience Publishers, 1964; *Synthesis of Poly(ester Carbonate) Copolymers* in *Journal of Polymer Science, Polymer Chemistry Edition*, volume 18, 75–90 (1980); *Polycarbonates* in *Encyclopedia of Polymer Science and Engineering*, volume 11, second edition, 1988, pages 648–718 and *Polycarbonate* in Becker/Braun *Kunststoff-Handbuch*, volume 3/1, *Polycarbonate, Polyacetale, Polyester, Celluloseester*, Carl Hanser Verlag 1992, pages 117–299.

The thermoplastic polycarbonates, including the thermoplastic, aromatic polyester carbonates have average molecular weights $\overline{M}_w$ (determined by measuring the relative viscosity at 25° C. in $CH_2Cl_2$ and a concentration of 0.5 g per 100 ml of $CH_2Cl_2$) of 12000 to 120000, preferably of 18000 to 80000 and in particular of 22000 to 60000.

Diphenols suitable for the production of the polycarbonates are, for example, hydroquinone, resorcinol, dihydroxydiphenyls, bis-(hydroxyphenyl)alkanes, bis-(hydroxyphenyl)cycloalkanes, bis-(hydroxyphenyl) sulphides, bis-(hydroxyphenyl) ethers, bis-(hydroxyphenyl)

ketones, bis-(hydroxyphenyl) sulphones, bis-(hydroxyphenyl) sulphoxides, α,α'-bis-(hydroxyphenyl) diisopropylbenzenes, together with the ring-alkylated and ring-halogenated derivatives thereof.

Preferred diphenols are 4,4'-dihydroxydiphenyl, 2,2-bis-(4-hydroxyphenyl)-propane, 2,4-bis-(4-hydroxyphenyl)-2-methylbutane, 1,1-bis-(4-hydroxyphenyl)-p-diisopropylbenzene, 2,2-bis-(3-methyl-4-hydroxyphenyl)propane, 2,2-bis-(3-chloro-4-hydroxyphenyl)propane, bis-(3,5-dimethyl-4-hydroxyphenyl)methane, 2,2-bis-(3,5-dimethyl-4-hydroxyphenyl)propane, bis-(3,5-dimethyl-4-hydroxyphenyl) sulphone, 2,4-bis-(3,5-dimethyl-4-hydroxyphenyl)-2-methylbutane, 1,1-bis-(3,5-dimethyl-4-hydroxyphenyl)-p-diisopropylbenzene, 2,2-bis-(3,5-dichloro-4-hydroxy-phenyl)propane, 2,2-bis-(3,5-dibromo-4-hydroxyphenyl)propane and 1,1-bis-(4-hydroxyphenyl)-3,3,5-trimethylcyclohexane.

Particularly preferred diphenols are 2,2-bis-(4-hydroxyphenyl)propane, 2,2-bis-(3,5-dimethyl-4-hydroxyphenyl)propane, 2,2-bis-(3,5-dichloro-4-hydroxyphenyl)-propane, 2,2-bis-(3,5-dibromo-4-hydroxyphenyl)propane, 1,1-bis-(4-hydroxy-phenyl) cyclohexane and 1,1-bis-(4-hydroxyphenyl)-3,3,5-trimethylcyclohexane.

These and further suitable diphenols are described, for example, in U.S. Pat. Nos. 3,028,635, 2,999,835, 3,148,172, 2,991,273, 3,271,367, 4,982,014 and 2,999,846, in German published patent applications 1 570 703, 2 063 050, 2 036 052, 2 211 956 and 3 832 396, French patent 1 561 518, in *Chemistry and Physics of Polycarbonates*, Interscience Publishers, New York, 1964 and in Japanese published patent applications 62039/1986, 62040/1986 and 105550/1086.

In the case of homopolycarbonates, only one diphenol is used and in the case of copolycarbonates, two or more diphenols are used.

Both monophenols and monocarboxylic acids are suitable chain terminators. Suitable monophenols are phenol itself, alkylphenols, such as cresols, p-tert.-butylphenol, p-n-octylphenol, p-iso-octylphenol, p-n-nonylphenol and p-iso-nonylphenol, halophenols, such as p-chlorophenol, 2,4-dichlorophenol, p-bromophenol and 2,4,6-tribromophenol.

Suitable monocarboxylic acids are benzoic acid, alkylbenzoic acids and halobenzoic acids.

Preferred chain terminators are the phenols of the formula (I)

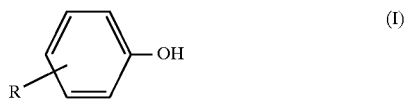

in which

R is a branched or unbranched $C_8$ and/or $C_9$ alkyl residue.

The quantity of chain terminator to be used amounts to 0.5 mol. % to 10 mol. %, relative to the molar quantity of diphenols used. The chain terminator may be added before, during or after phosgenation.

Suitable branching agents are the known tri- and greater than trifunctional compounds known in polycarbonate chemistry, in particular those having three or more than three phenolic OH groups.

Suitable branching agents are, for example, phloroglucinol, 4,6-dimethyl-2,4,6-tri-(4-hydroxyphenyl)-2-heptene, 4,6-dimethyl-2,4,6-tri-(4-hydroxyphenyl) heptane, 1,3,5-tri-(4-hydroxyphenyl)benzene, 1,1,1-tri-(4-hydroxyphenyl)ethane, tri-(4-hydroxyphenyl) phenylmethane, 2,2-bis-[4,4-bis-(4-hydroxyphenyl) cyclohexyl]-propane, 2,4-bis-(4-hydroxyphenylisopropyl) phenol, 2,6-bis-(2-hydroxy-5'-methylbenzyl)-4-methylphenol, 2-(4-hydroxyphenyl)-2-(2,4-dihydroxyphenyl)-propane, hexa-(4-(4-hydroxyphenylisopropyl)phenyl)orthoterephthalic acid ester, tetra-(4-hydroxyphenyl)methane, tetra-(4-(4-hydroxyphenylisopropyl)phenoxy)-methane and 1,4-bis-(4', 4''-dihydroxytriphenyl)methyl)benzene together with 2,4-dihydroxybenzoic acid, trimesic acid, cyanuric chloride and 3,3-bis-(3-methyl-4-hydroxyphenyl)-2-oxo-2,3-dihydroindole.

The quantity of the optionally used branching agent amounts to 0.05 mol. % to 2 mol. %, again relative to the molar quantity of diphenols used.

The branching agents may either be initially introduced with the diphenols and chain terminators in the aqueous alkaline phase or added before phosgenation dissolved in an organic solvent.

All these measures relating to the production of polycarbonates are familiar to the person skilled in the art.

Aromatic dicarboxylic acids suitable for the production of polyester carbonates are, for example, orthophthalic acid, terephthalic acid, isophthalic acid, tert.-butyl-isophthalic acid, 3,3'-diphenyldicarboxylic acid, 4,4'-diphenyldicarboxylic acid, 4,4'-benzophenonedicarboxylic acid, 3,4'-benzophenonedicarboxylic acid, 4,4'-diphenyl ether dicarboxylic acid, 4,4'-diphenylsulphone dicarboxylic acid, 2,2-bis-(4-carboxyphenyl)propane, trimethyl-3-phenylindane-4,5'-dicarboxylic acid.

Of the aromatic dicarboxylic acids, terephthalic acid and/or isophthalic acid are particularly preferably used.

Derivatives of the dicarboxylic acids are the dicarboxylic acid dihalides and the dicarboxylic acid dialkyl esters, in particular the dicarboxylic acid dichlorides and the dicarboxylic acid dimethyl esters.

Replacement of the carbonate groups by the aromatic dicarboxylic acid ester groups proceeds substantially stoichiometrically and also quantitatively, such that the molar ratio of the reactants is also found in the finished polyester carbonate. The aromatic dicarboxylic acid ester groups may be incorporated both randomly and in blocks.

Preferred production methods for the polycarbonates to be stabilised according to the invention, including the polyester carbonates, are the known phase interface process and the known melt transesterification process.

In the first case, the carbonic acid derivative used is preferably phosgene, while in the second case it is preferably diphenyl carbonate.

The thermoplastic compositions may contain polycarbonates in quantities of 20 to 90 wt. %. They are generally produced by melt processing in kneaders or extruders at 220° C. to 280° C. The blends containing PC may be extruded or injection moulded to yield mouldings, which may be used in electrical applications, electronics, household appliances or in the automotive sector.

EXAMPLES

The SAN used was a styrene/acrylonitrile copolymer containing 28 wt. % acrylonitrile and of a specific viscosity of 60 g/l (5 g/l, DMF 20° C.), the graft was a graft copolymer on 40 parts by weight of an NBR latex having an acrylonitrile content of 7 wt. % and an average particle diameter of 190 nm as the grafting backbone with 60 parts by weight of styrene/acrylonitrile in a 70:30 ratio as graft monomers mixed with 3.8 parts by weight of NBR having an acrylonitrile content of 7 wt. %, the acid-functional nitrile rubber was an NBR having 7 wt. % of fumaric acid and 26 wt. % of acrylonitrile as comonomers and the silicone oil was a polydimethylsiloxane having a viscosity of 13 centistokes.

The components were mixed in a kneader at 190° C.

COMPARATIVE EXAMPLE 37 parts by weight of graft, 63 parts by weight of SAN and 0.15 parts by weight of silicone oil and 3 parts by weight of rutile are mixed. Impact strength is 40.9 kJ/m$^2$, notched impact strength is 12.9 kJ/m$^2$, hardness 104, injection pressure 149 bar.

EXAMPLE 1

30 parts by weight of graft, 70 parts by weight of SAN, 0.15 parts by weight of silicone oil, 3 parts by weight of acid-functional nitrile rubber and 3 parts by weight of rutile were mixed. Impact strength is 113 kJ/m$^2$, notched impact strength is 20.6 kJ/m$^2$, hardness 113, injection pressure 138 bar.

This blend exhibits improved impact strength at higher hardness, properties which conventionally tend to be inversely proportional. Injection pressure is also lower, i.e. flow is improved.

The good properties are surprisingly achieved at a lower graft content.

EXAMPLE 2

30 parts by weight of graft, 70 parts by weight of SAN, 0.5 parts by weight of silicone oil, 3 parts by weight of acid-functional nitrile rubber and 3 parts by weight of rutile are mixed. Impact strength is 126 kJ/m$^2$, notched impact strength is 21.4 kJ/m$^2$, hardness 106, injection pressure 144 bar.

We claim:

1. Thermoplastic composition comprising:
    A) 80 to 99.7 wt. % of a two-phase plastic comprising:
        A.1) 0 to 90 parts by weight of a thermoplastic co- or terpolymer of styrene, α-methylstyrene, ring-substituted styrene, methyl methacrylate, acrylonitrile, methacrylonitrile, maleic anhydride, N-substituted maleimide, vinyl acetate or mixtures thereof and
        A.2) 10 to 100 parts by weight of a graft product of
            A.2.1) 5 to 90 parts by weight of styrene, α-methylstyrene, ring-substituted styrene, methyl methacrylate, acrylonitrile, methacrylonitrile, maleic anhydride, N-substituted maleimide, vinyl acetate or mixtures thereof on
            A.2.2) 95 to 100 parts by weight of a rubber copolymer of 70 to 95 wt. % of butadiene and 5 to 30 wt. % of acrylonitrile having an average particle diameter of 100 to 250 μm and
    B) 0.3 to 20 wt. % of an acid-functional nitrile rubber.

2. A thermoplastic composition according to claim 1, wherein component A) comprises 10 to 80 parts by weight of component A.1) and 90 to 20 parts by weight of component A.2).

3. A thermoplastic composition according to claim 1, wherein component A) comprises 20 to 75 parts by weight of component A.1) and 80 to 25 parts by weight of component A.2).

4. A thermoplastic composition according to claim 1, wherein component A.2) is a graft product of 30 to 80 parts by weight of component A.2.1) and 70 to 20 parts by weight of component A.2.2).

5. A thermoplastic composition according to claim 2, wherein component A.2) is a graft product of 30 to 80 parts by weight of component A.2.1) and 70 to 20 parts by weight of component A.2.2).

6. A thermoplastic composition according to claim 3, wherein component A.2) is a graft product of 30 to 80 parts by weight of component A.2.1) and 70 to 20 parts by weight of component A.2.2).

7. A thermoplastic composition according to claim 1, wherein component A.2) is a graft product of a mixture of styrene and acrylonitrile on a polybutadiene/acrylonitrile copolymer.

8. A thermoplastic composition according to claim 7, wherein the mixture of styrene and acrylonitrile contains 50 to 90 wt. % of styrene and 10 to 50 wt. % of acrylonitrile.

9. A thermoplastic composition according to claim 7, wherein said polybutadiene is crosslinked.

10. A thermoplastic composition according to claim 1, wherein said acid-functional nitrile rubber is a copolymer comprising 10 to 50 wt. % of acrylonitrile, 89.5 to 40 wt. % of butadiene and 0.5 to 10 wt. % of an acid selected from the group consisting of acrylic acid, methacrylic acid, fumaric acid, itaconic acid and maleic acid.

11. A thermoplastic composition according to claim 1, wherein said acid-functional nitrile rubber is a copolymer consisting essentially of 10 to 50 wt. % of acrylonitrile, 89.5 to 40 wt. % of butadiene and 0.5 to 10 wt. % of an acid selected from the group consisting of acrylic acid, methacrylic acid, fumaric acid, itaconic acid and maleic acid.

12. A thermoplastic composition according to claim 10, wherein the acid is fumaric acid or methacrylic acid.

* * * * *